United States Patent [19]

Hahn et al.

[11] 4,264,171

[45] Apr. 28, 1981

[54] SINGLE-LENS MIRROR REFLEX CAMERA AND RELEASE MECHANISM THEREFOR

[75] Inventors: Werner Hahn; Günther Heerklotz, both of Dresden, German Democratic Rep.

[73] Assignee: Veb Pentacon Dresden Kamera- und Kinowerke, Dresden, German Democratic Rep.

[21] Appl. No.: 66,709

[22] Filed: Aug. 15, 1979

[30] Foreign Application Priority Data

Aug. 30, 1978 [DD] German Democratic Rep. ... 207551

[51] Int. Cl.³ .............................................. G03B 19/12
[52] U.S. Cl. .................................... 354/152; 354/153; 354/270
[58] Field of Search ................. 354/152, 153, 156, 270

[56] References Cited

U.S. PATENT DOCUMENTS

| | | | |
|---|---|---|---|
| 3,961,339 | 6/1976 | Akiyama | 354/152 X |
| 4,160,592 | 7/1979 | Noack et al. | 354/153 X |
| 4,173,403 | 11/1979 | Ueda et al. | 354/152 |

Primary Examiner—John Gonzales
Attorney, Agent, or Firm—James C. Wray

[57] ABSTRACT

A release mechanism is provided for the viewfinder mirror, which is held in the viewfinder position, of a single-lens mirror reflex camera having a photoelectrically controlled lens diaphragm. A locking device in the release mechanism, which device interrupts the closing of the lens diaphragm, comprises a detent tooth (31) which keeps the viewfinder mirror (27) in the viewfinder position against the action of the swivel spring (30). The tooth (31) can be brought out of engagement with the swivelling lever (10) of the viewfinder mirror (27) upon the electromagnetic release of the locking device for the interruption of the closing of the lens diaphragm.

This achieves a release of the viewfinder mirror, and thus the initiation of the exposure operation, to be effected approximately simultaneously with the photoelectrically controlled interruption of the closing of the diaphragm.

2 Claims, 1 Drawing Figure

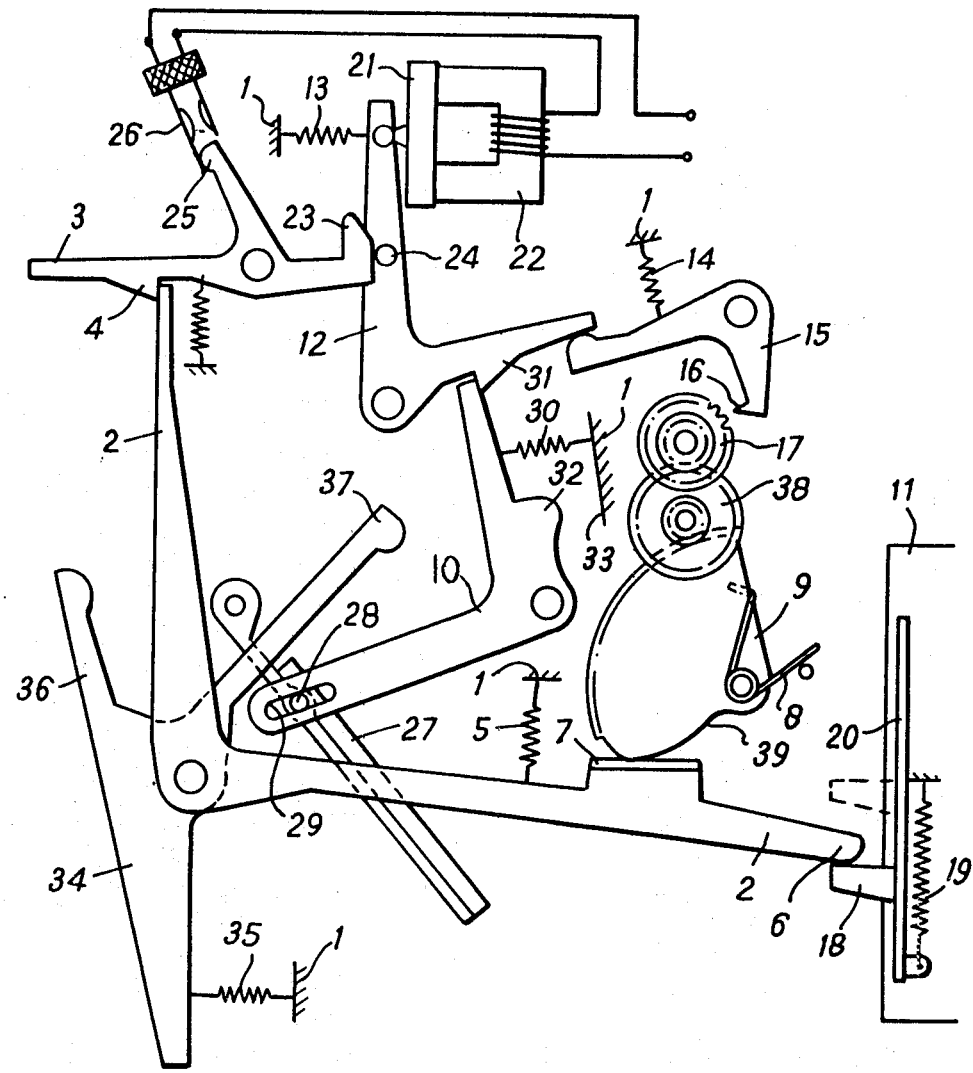

SINGLE-LENS MIRROR REFLEX CAMERA AND RELEASE MECHANISM THEREFOR

BACKGROUND OF THE INVENTION

The invention relates to a releasing device for the viewfinder mirror, which is held in the viewfinder position, of a single-lens mirror reflex camera having a photoelectrically controlled lens diaphragm.

STATEMENT OF PRIOR ART

In known arrangements of this kind, the viewfinder mirror is released, for the initiation of an exposure process, by a spring-driven lever which continues its travel, which is braked by a damper, following the photoelectrically controlled interruption of the closing of the lens diaphragm and only releases the viewfinder mirror towards the end of this travel. It is precisely for photographing moving objects that the photographer will pre-select a short exposure time, so that a large diaphragm aperture has to come about. The closing of the diaphragm is therefore interrupted soon after the beginning of the closing operation; however, the release of the viewfinder mirror, and consequently the initiation of an exposure process, is not effected until the spring-driven lever has reached its end position, which is defined by the smallest diaphragm opening.

OBJECT OF THE INVENTION

For the purpose of better photographic acquisition of moving objects, it is the object of the invention to cause the release of the viewfinder mirror, and thus the initiation of the exposure operation, to be effected approximately simultaneously with the photoelectrically controlled interruption of the closing of the diaphragm.

SUMMARY OF THE INVENTION

According to the invention there is provided a single-lens mirror reflex camera having a photoelectrically controlled lens diaphragm, a pivotable mirror movable between a viewing position and an exposure position, a pivotable lever for moving said mirror into the viewing position, and a spring for urging said lever in a direction to move said mirror into its exposure position, comprising a locking device which interrupts the closing of the lens diaphragm; a detent of said locking device engageable with said pivotable lever to hold said viewfinder mirror in its viewing position against the action of its spring, and electromagnetically operable release means which on actuation effects release of the locking device to cause interruption of the closing of the lens diaphragm and to effect disengagement of said detent with said pivotable lever whereby said mirror moves into the exposure position.

BRIEF DESCRIPTION OF DRAWING

The invention will be explained with reference to an illustrated and described exemplified embodiment.

DESCRIPTION OF PREFERRED EMBODIMENT

The lens housing 11 is exchangeably fastened to a camera housing 1. The diaphragm ring 20 is sought to be drawn into the smallest diaphragm opening by the closing spring 19. Connected to the diaphragm ring 20 is the tang 18, with which the cam 6 of an adjusting lever 2, which is rotatably mounted in the camera housing 1, is in engagement. The adjusting lever 2 is under the control of the adjusting spring 5 which seeks to rotate the adjusting lever 2 in the anti-clockwise sense. The adjusting lever 2 is held, against the action of the adjusting spring 5, by the nose 4 of the camera relese 3. The adjusting lever 2 furthermore comprises a driving lug 7, with which the return spring 8 keeps the tooth segment 9 in contact. The edge 39 on the tooth segment 9 is so shaped that the tooth segment 9 increasingly has to travel longer distances than the adjusting lever 2; by this means, the tooth segment 9 rotates through equal angles per stop interval. The tooth segment 9 is in engagement, through the stopping wheel 38, with the locking wheel 17, into which the locking tooth 16 of the locking lever 15 can be swung due to the action of the detent spring 14.

The locking lever 15 is kept out of engagement with the locking wheel 17 by the armature lever 12. The armature lever 12 is sought to be rotated in the anti-clockwise sense by the release spring 13. The armature 21 for the electromagnet 22 is pivotally mounted on the armature lever 12. Against the action of the release spring 13, the armature lever 12 is blocked by the cam 23 of the camera release 3 in that the cam 23 presses against the pin 24 so that the armature 21 bears against the electromagnet 22. A trip cam 25 of the camera release 3 keeps the switch 26 opened in the circuit of the electromagnet 22.

The viewfinder mirror 27, whose coupling pin 28 projects through the slot 29 of the swivelling lever 10, is furthermore pivotally mounted in the camera housing 1. The swivelling lever 10 is sought to be rotated in the clockwise sense by the swivel spring 30, but is prevented therefrom by the detent tooth 31 of the armature lever 12. The swivelling lever 10 is provided with the stop 32 which terminates the swivel movement when it impinges on the edge 33 in the camera housing 1.

Finally, there is rotatably mounted in the camera housing 1 the cocking lever 34 which is under the control of the restoring spring 35 and comprises the first cocking arm 36 for the adjusting lever 2 as well as the second cocking arm 37 for the swivelling lever 10.

The mode of operation of the arrangement is the following:

The actuation of the camera release 3 in the clockwise sense causes the switch 26 for closing and exciting the electromagnet 22 to be enabled by the trip cam 25, the cam 23 to be removed from the pin 24 of the armature lever 12 and the nose 4 to become disengaged from the adjusting lever 2, so that this latter travels in the anti-clockwise sense due to its adjusting spring 5. The driving lug 7 causes the tooth segment 9 to be rotated against the action of the return spring 8, during which process the tooth segment is braked by the braking wheel 38 as well as the locking wheel 17. The closing spring 19 causes the diaphragm ring 20 to follow the rotation of the adjusting lever 2, whereby the lens diaphragm begins to close from its maximum diaphragm opening towards the minimum diaphragm opening. A photoelectric transducer, which is not shown and lies behind the lens diaphragm, is therefore darkened more and more so that, when a threshold value is reached, the electromagnet 22 is de-energised through a known 'per se' flip-flop connection and the armature 21 can be pulled from the releasing spring 13. Due to the rotation of the armature lever 12 in the anti-clockwise sense, the detent spring 14 can rotate the locking lever 15 and swing the detent tooth 16 into the locking wheel 17. This causes the travel of the adjusting lever 2 and the further closing of the lens diaphragm to be blocked, for the lens diaphragm is now automatically set in accordance with the prevailing object brightness.

During the rotation of the armature lever 12 in the anti-clockwise sense, the detent tooth 31 is disengaged from the swivelling lever 10 so that the swivel spring 30 can swivel the viewfinder mirror 27 from the viewfinder position shown. Shortly before the stop 32 of the swivelling lever 10 reaches the edge 33, the camera shutter is released by the swivelling lever 10. The rotation of the cocking lever 34 in the clockwise sense against the action of the return spring 35 caues there to be returned to the positions of readiness shown the adjusting lever 2 through the first cocking arm 36 and the swivelling lever 10 with the viewfinder mirror 27 through the second cocking arm 37.

We claim:

1. In a single-lens mirror reflex camera having a photoelectrically controlled lens diaphragm, a pivotable mirror movable between a viewing position and an exposure position, a pivotable lever for moving said mirror into the viewing position, and a spring for urging said lever in a direction to move said mirror into its exposure position, the provision of:
   (a) a locking device which interrupts the closing of the lens diaphragm;
   (b) a detent of said locking device engageable with said pivotable lever to hold said viewfinder mirror in its viewing position against the action of its spring; and
   (c) electromagnetically operable release means which on actuation effects release of the locking device to cause interruption of the closing of the lens diaphragm and to effect disengagement of said detent with said pivotable lever whereby said mirror moves into the exposure position.

2. A single-lens mirror reflex camera according to claim 1, wherein a second spring urges said detent towards a position to disengage said pivotable lever, and the locking device comprises a locking lever drivable by said second spring into a position to effect said interruption, said detent being electromagnetically held against the action of said second spring to hold the locking lever in its inoperative position.

* * * * *